(12) United States Patent
Oh et al.

(10) Patent No.: US 10,975,811 B2
(45) Date of Patent: Apr. 13, 2021

(54) SYSTEM AND METHOD OF SECURING BRAKE BOOSTER NEGATIVE PRESSURE

(71) Applicants: Hyundai Motor Company, Seoul (KR); Kia Motors Corporation, Seoul (KR)

(72) Inventors: Young-Kyu Oh, Gyeonggi-do (KR); Youn-Su Kim, Gyeonggi-do (KR); Keum-Jin Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/699,908

(22) Filed: Dec. 2, 2019

(65) Prior Publication Data

US 2020/0332749 A1    Oct. 22, 2020

(30) Foreign Application Priority Data

Apr. 22, 2019  (KR) ..................... 10-2019-0046868

(51) Int. Cl.
  *F02M 35/10* (2006.01)
  *B60T 13/72* (2006.01)
  *F02M 25/08* (2006.01)
  *F02M 23/12* (2006.01)

(52) U.S. Cl.
  CPC ....... *F02M 35/10229* (2013.01); *B60T 13/72* (2013.01); *F02M 23/12* (2013.01); *F02M 25/089* (2013.01); *F02M 25/0872* (2013.01)

(58) Field of Classification Search
  CPC ............. F02M 35/10229; F02M 23/12; F02M 25/0872; F02M 25/089; B60T 13/72
  See application file for complete search history.

(56) References Cited

U.S. PATENT DOCUMENTS

| | | | |
|---|---|---|---|
| 2005/0218716 A1* | 10/2005 | Collins | B60T 17/22 303/115.3 |
| 2016/0115912 A1* | 4/2016 | Takagawa | B60T 13/52 123/518 |
| 2016/0153448 A1* | 6/2016 | Lee | F04C 18/3441 60/605.1 |

FOREIGN PATENT DOCUMENTS

| KR | 19980038643 A | 8/1998 |
|---|---|---|
| KR | 20050118397 A | 12/2005 |

* cited by examiner

*Primary Examiner* — Kevin A Lathers
(74) *Attorney, Agent, or Firm* — Mintz Levin Cohn Ferris Glovsky and Popeo, P.C.; Peter F. Corless (57) ABSTRACT

A method of securing brake booster negative pressure is provided. The method includes operating a purge pump that is connected to a canister having evaporation gas absorbed thereon and a brake booster and determining whether the evaporation gas is injected into an intake pipe by the operation of the purge pump. Whether a negative pressure of the brake booster is insufficient is determined and when the evaporation gas is being injected into the intake pipe and the negative pressure is insufficient, a degree of opening of a valve provided in a line connecting the canister and the purge pump is adjusted.

16 Claims, 10 Drawing Sheets

SYSTEM AND METHOD OF SECURING BRAKE BOOSTER NEGATIVE PRESSURE

CROSS-REFERENCE(S) TO RELATED APPLICATIONS

This application claims priority to Korean Patent Application No. 10-2019-0046868, filed on Apr. 22, 2019, which is incorporated herein by reference in its entirety.

BACKGROUND

Field of the Disclosure

The present disclosure relates to a system and method of securing brake booster negative pressure; and, more particularly, to a method of securing brake booster negative pressure, for compressing the evaporation gas adsorbed on a canister to supply it to an intake pipe.

Description of Related Art

The liquid fuel existing in a fuel tank evaporates and becomes gas based on the change in temperature or pressure. If excessive evaporation gas is generated in the fuel tank, the internal pressure of the fuel tank may be increased more than necessary, and in some cases, the evaporation gas may leak into the atmosphere. Accordingly, the evaporation gas generated in the fuel tank must be appropriately removed. Conventionally, the negative pressure applied to an intake pipe during the operation of an engine allows evaporation gas to be suctioned into the intake pipe from a canister and burned together with a mixture.

However, when a supercharger is mounted to the engine and an amount of supercharging is substantial, the internal pressure of the intake pipe is equal to or greater than the atmospheric pressure. Since the negative pressure applied to the intake pipe changes based on the amount of supercharging, it may be difficult to apply the conventional evaporation gas treatment method to the vehicle equipped with the supercharger without change.

Furthermore, a brake booster is mounted to a brake pedal. The brake booster induces a uniform braking force to be generated even though the operating force applied to the brake pedal differs for each driver. The brake booster includes a cylinder mounted to one side of the brake pedal, a valve disposed on the cylinder to be opened or closed by the operation of the brake pedal, and a piston pressed against one side wall of the cylinder by the change in internal pressure of the cylinder caused by the opening of the valve.

Generally, the brake booster is connected to an intake manifold to maintain the internal pressures of both internal spaces of the cylinder defined by a piston in a vacuum-like state. However, when the supercharger is mounted to the engine and the amount of supercharging is substantial, the internal pressure of the intake manifold may be equal to or greater than the atmospheric pressure based on the amount of supercharging, thereby causing the negative pressure applied to the cylinder to be less than necessary.

SUMMARY

An exemplary embodiment of the present disclosure provides a method of securing brake booster negative pressure, which is capable of smoothly injecting evaporation gas adsorbed on a canister into an intake pipe while smoothly applying a negative pressure to a brake booster even when a supercharger is mounted to a vehicle.

Other objects and advantages of the present disclosure may be understood by the following description, and become apparent with reference to the exemplary embodiments of the present disclosure. Additionally, it is obvious to those skilled in the art to which the present disclosure pertains that the objects and advantages of the present disclosure may be realized by the means as claimed and combinations thereof.

In accordance with an exemplary embodiment of the present disclosure, a method of securing brake booster negative pressure may include operating a purge pump connected to a canister having evaporation gas absorbed thereon and a brake booster, determining whether the evaporation gas is injected into an intake pipe by the operation of the purge pump, and determining whether a negative pressure of the brake booster is insufficient. When the evaporation gas is being injected into the intake pipe and the negative pressure is insufficient, a degree of opening of a valve provided in a line connecting the canister and the purge pump may be adjusted.

A rotational speed of the purge pump may be gradationally adjusted to allow the evaporation gas to be injected into the intake pipe at a desired concentration. When the negative pressure is insufficient in a state in which the evaporation gas is being injected into the intake pipe and the degree of opening of the valve is adjusted, an operation state of a convenience electronic device mounted to a vehicle may be adjusted.

The convenience electronic device may be repeatedly turned on/off at intervals less than a particular period of time when or after an operation thereof is stopped for the particular period of time, or the convenience electronic device may be repeatedly turned on/off at increasing intervals for the particular period of time after the operation thereof is stopped for the particular period of time. When the negative pressure is insufficient in a state in which the evaporation gas is being injected into the intake pipe, the degree of opening of the valve may be adjusted, and the operation state of the convenience electronic device may be adjusted, an operation of an intake valve may be adjusted.

A closing timing of the intake valve may be advanced based on a top dead center, and an opening/closing length of the intake valve protruding to a combustion chamber may be decreased. An opening timing of the intake valve may be advanced based on a top dead center, and an opening/closing length of the intake valve protruding to a combustion chamber may be maintained.

When the negative pressure is insufficient in a state in which the evaporation gas is being injected into the intake pipe, the degree of opening of the valve may be adjusted, the operation state of the convenience electronic device may be adjusted, and the opening/closing timing of the intake valve may be adjusted, an ignition timing of a mixture reaching a combustion chamber may be adjusted. The ignition timing may be advanced based on a top dead center so that it is earlier. When the evaporation gas is not being injected into the intake pipe, the degree of opening of the valve provided in the line connecting the canister and the purge pump may be adjusted.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described below in more detail with reference to the accompanying drawings. The present disclosure may, however, be embodied in different forms and should not be construed as limited to the embodiments set forth herein. Rather, these exemplary embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a method of securing brake booster negative pressure according to an exemplary embodiment of the present disclosure will be described with reference to the accompanying drawings.

Figure 1:
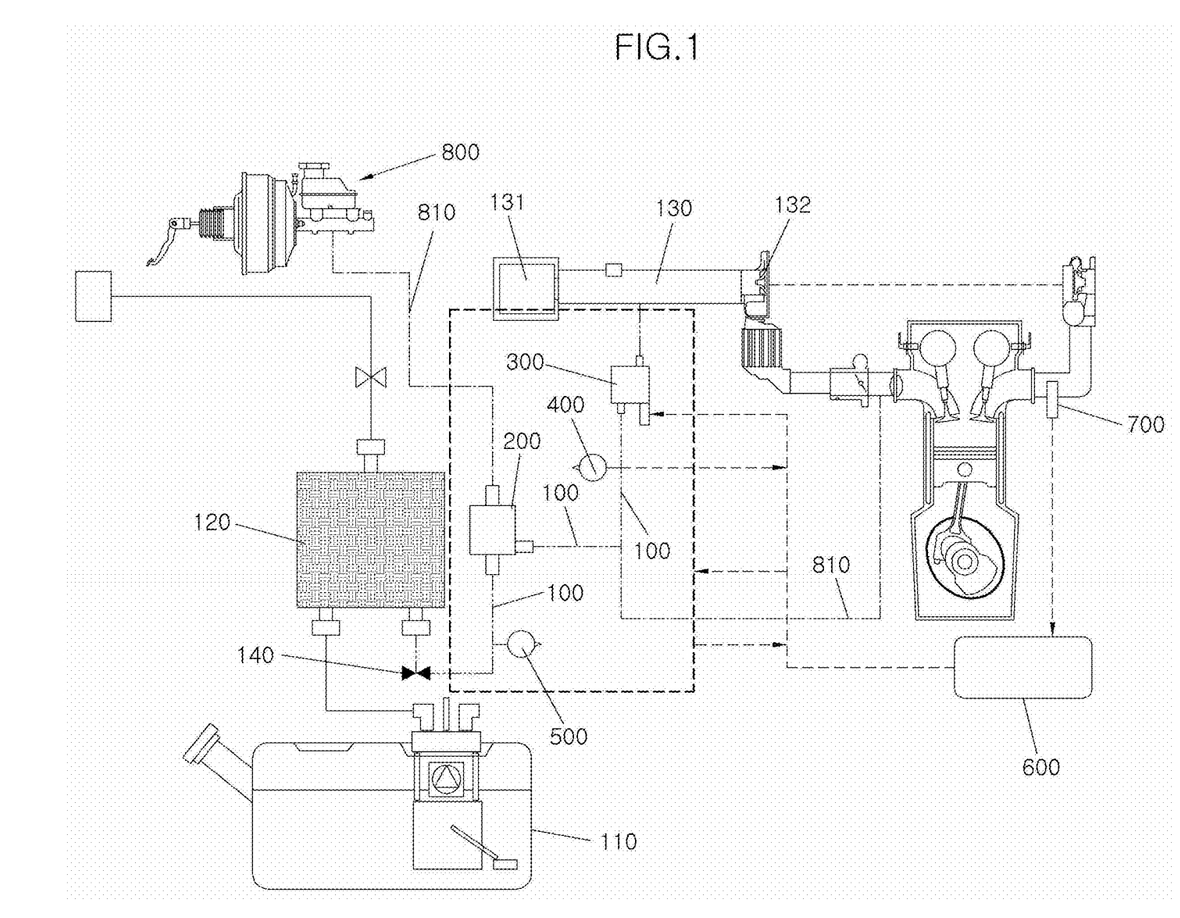
FIG. 1 is a diagram illustrating a system for securing brake booster negative pressure according to an exemplary embodiment of the present disclosure.

As illustrated in FIG. 1, a system for securing a negative pressure of a brake booster 800 by a purge pump 200 according to an exemplary embodiment of the present disclosure may include a purge line 100 that connects a canister 120 on which the evaporation gas in a fuel tank 110 is adsorbed and an intake pipe 130, a purge pump 200 mounted on the purge line 100, a purge valve 300 mounted on the purge line 100 to be positioned between the purge pump 200 and the intake pipe 130, a brake booster 800 operated by the operation of a brake pedal, a booster line 810 that connects the brake booster 800, the purge pump 200, and the intake pipe 130, a first pressure sensor 400 mounted on the purge line 100 to be positioned between the purge pump 200 and the purge valve 300, and a controller 600 configured to receive a signal from the first pressure sensor 400 and transmit an actuation signal to the purge pump 200 and the purge valve 300. In addition, a second pressure sensor 500 and a valve 140 may be mounted on the purge line 100 to be positioned between the canister 120 and the purge pump 200.

Additionally, the canister 120 may be connected to the atmosphere via a line. A vent valve may be provided on the line. The controller 600 may be configured to receive a signal from a lambda sensor 700 for detecting the amount of oxygen in combustion gas. The controller 600 may then be configured to determine an air-fuel ratio of mixture gas combusted in a combustion chamber, based on the amount of oxygen detected by the lambda sensor 700. The controller 600 may be configured to transmit and receive signals to and from a fuel supply system that supplies fuel to the combustion chamber.

Further, an air cleaner 131 may be mounted at the end of the intake pipe 130. The intake pipe 130 may include a compressor 132 interlocked with a turbocharger mounted to an exhaust pipe. An intercooler may be mounted between the compressor 132 and an intake manifold. The purge line 100 may include the purge pump 200, the purge valve 300, the first pressure sensor 400, the second pressure sensor 500, and a flow meter sensor. The first and second pressure sensors 400 and 500 may be configured to continuously detect the pressures at the front and rear ends of the purge pump 200 and transmit the pressures to the controller 600. The flow meter sensor may be positioned between the purge valve 300 and the intake pipe 130. The flow meter sensor may be configured to continuously detect the amount of evaporation gas flowing from the purge line 100 to the intake pipe 130 and transmit the amount to the controller 600.

The controller 600 may thus be configured to synthesize the signals received from the fuel supply system, the lambda sensor 700, the first pressure sensor 400, the second pressure sensor 500, and the flow meter sensor, and adjust the rotational speed of the purge pump 200, and the amount of opening and the opening/closing timing of the purge valve 300 to adjust the evaporation gas flowing from the purge line 100 to the intake pipe 130 into the purge valve 130 to be a desired purge flow rate. The fuel supply system may be configured to transmit an engine condition, a vehicle speed, a current injection amount of fuel, and the like to the controller 600.

The controller 600 may be configured to operate the purge pump 200 and the purge valve 300 based on the information detected by various sensors to adjust an amount of evaporation gas flowing from the purge line 100 to the intake pipe 130. Therefore, the flow rate of the evaporation gas supplied from the canister 120 to the intake pipe 130 may be regulated nonlinearly.

The purge pump 200 is manufactured such that the rotational speed (RPM) thereof may be maintained at or changed to 60,000, 45,000, or 30,000 for unit time. By adjusting the rotational speed of the purge pump 200 and the amount of opening and the opening/closing timing of the purge valve 300, it may be possible to deduce a concentration of evaporation gas condensed between the purge pump 200 and the purge valve 300 in the purge line 100.

A negative pressure may be continuously applied to the brake booster 800 by the operation of the purge pump 200. The booster line 810 may partially overlap with the purge line 100. Since the compressor as a supercharger is mounted to the intake pipe, the amount of supercharging may be less than a predetermined reference value based on the traveling state of the vehicle.

Figure 2A:
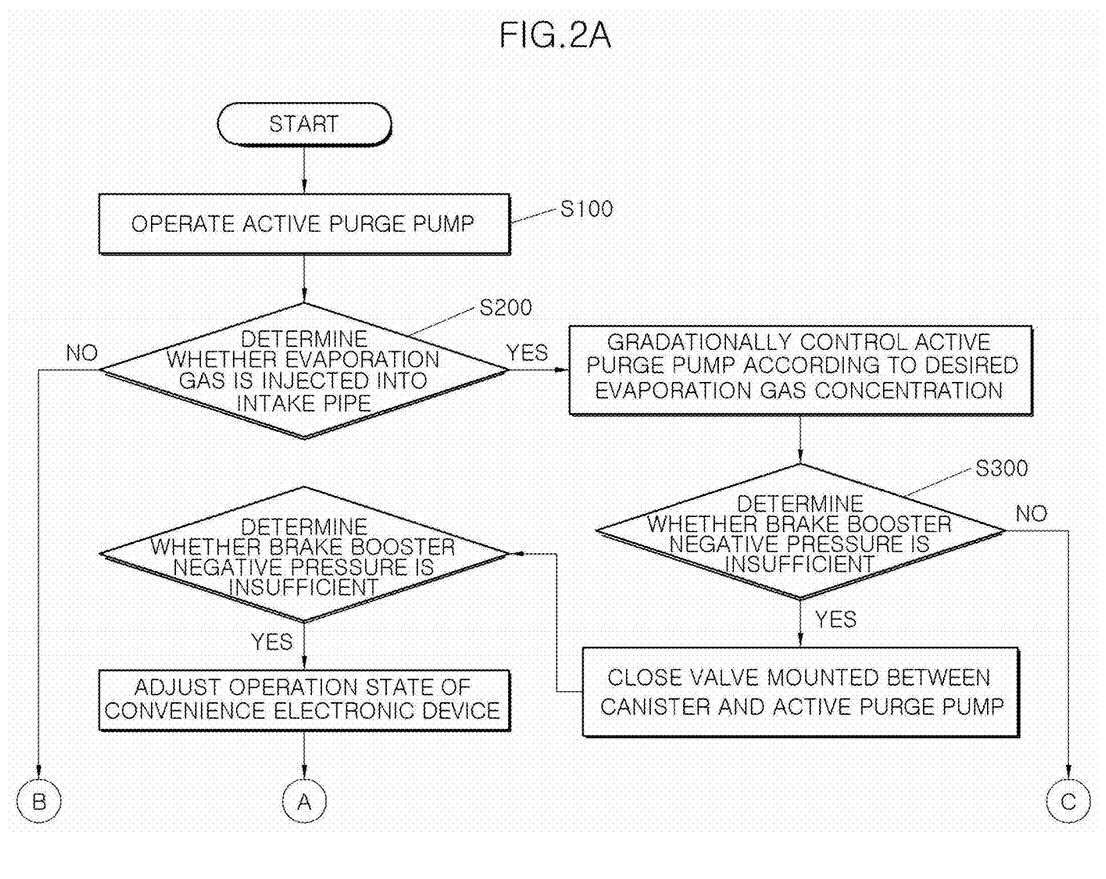
FIGS. 2A-2B are flowcharts illustrating a method securing brake booster negative pressure according to an exemplary embodiment of the present disclosure.
Figure 2B:
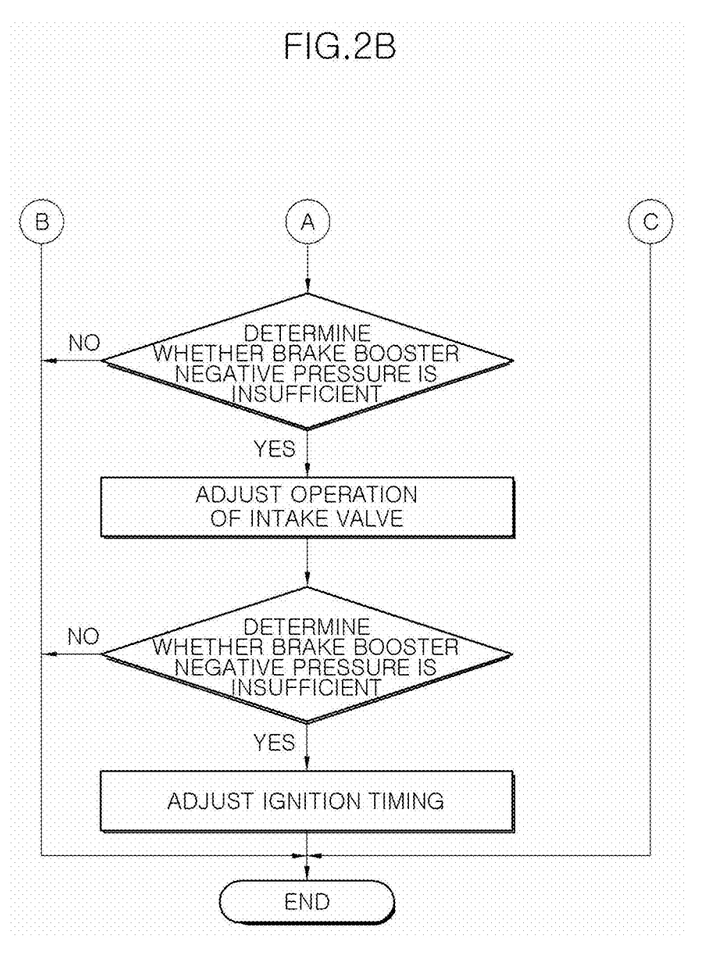

The system for securing the negative pressure of the brake booster 800 having the above-mentioned configuration according to the exemplary embodiment of the present disclosure operates as in the flowchart illustrated in FIG. 2, processes evaporation gas, and generates a negative pressure in the brake booster 800. The engine may include control devices such as a continuously variable valve timing (CVVT), a continuously variable valve duration (CVVD), and a continuously variable valve lift (CVVL) for adjusting the operation timings, the operation holding times, and the opening/closing lengths of the intake and exhaust valves. The method described herein below may be executed by a controller.

As illustrated in FIGS. 2A to 9, a method of securing a negative pressure of a brake booster 800 by a purge pump 200 according to an exemplary embodiment of the present disclosure may include operating a purge pump 200 connected to a canister 120 having evaporation gas absorbed thereon and a brake booster 800 (S100), determining whether the evaporation gas is injected into an intake pipe 130 by the operation of the purge pump 200 (S200), and determining whether the negative pressure of the brake booster 800 is insufficient (S300). When the evaporation gas is being injected into the intake pipe 130 and the negative pressure is insufficient, the amount of opening of a valve 140 provided in a purge line 100 connecting the canister 120 and the purge pump 200 may be adjusted.

According to an example, the valve 140, the amount of opening of which is adjusted, may be closed. The valve 140 may be changed to an on/off state to abruptly change the amount of opening thereof based on the operation signal of a brake pedal and the change of the negative pressure applied to the brake booster 800. The valve 140 may be maintained in a closed state when the evaporation gas is not being injected into the intake pipe 130. When the evaporation gas is injected into the intake pipe 130, the rotational speed of the purge pump 200 may be gradationally adjusted such that the evaporation gas may be injected into the intake pipe 130 at a desired concentration, as described above.

Figure 3:
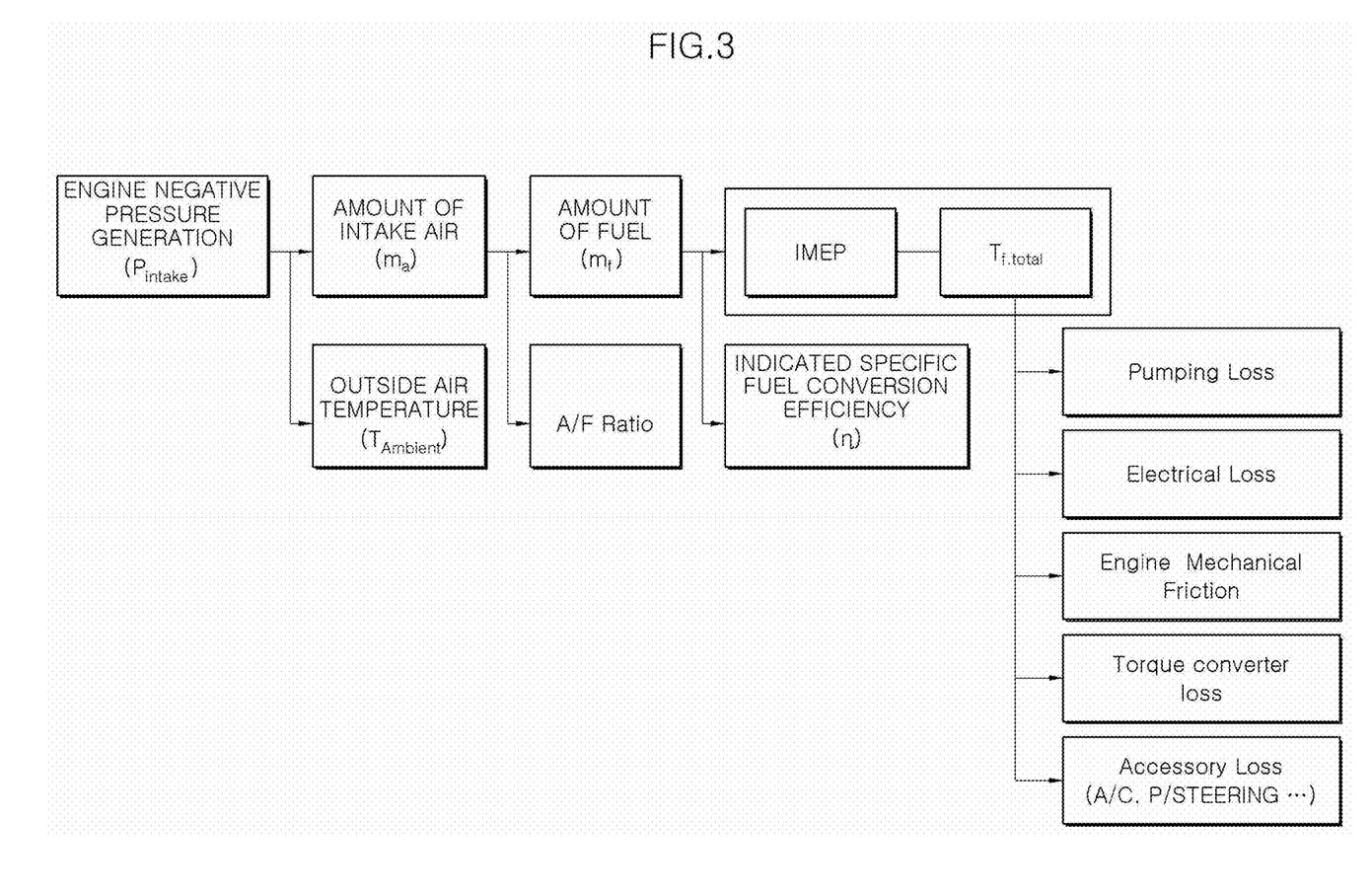
FIG. 3 is a block diagram illustrating a relationship between a total friction torque and an engine negative pressure caused by engine operation according to an exemplary embodiment of the present disclosure.

Meanwhile, a total friction torque T of the engine may be calculated from the driving condition of the vehicle. As illustrated in FIG. 3, an amount of fuel mf may be calculated using the total friction torque T and a fuel conversion efficiency η. An amount of intake air (ma) may be calculated using the amount of fuel mf and an air-fuel ratio. An engine negative pressure P may be calculated using the amount of intake air (ma), an outside air temperature, and a pre-prepared correction factor.

In addition, the total friction torque T is reduced by various factors such as pumping loss due to piston motion, electrical loss due to electronic device operation, engine mechanical friction, torque converter loss, and various accessory losses. Accordingly, when the factor of decreasing the total friction torque T is adjusted, the engine negative pressure P may be increased.

Figure 4:
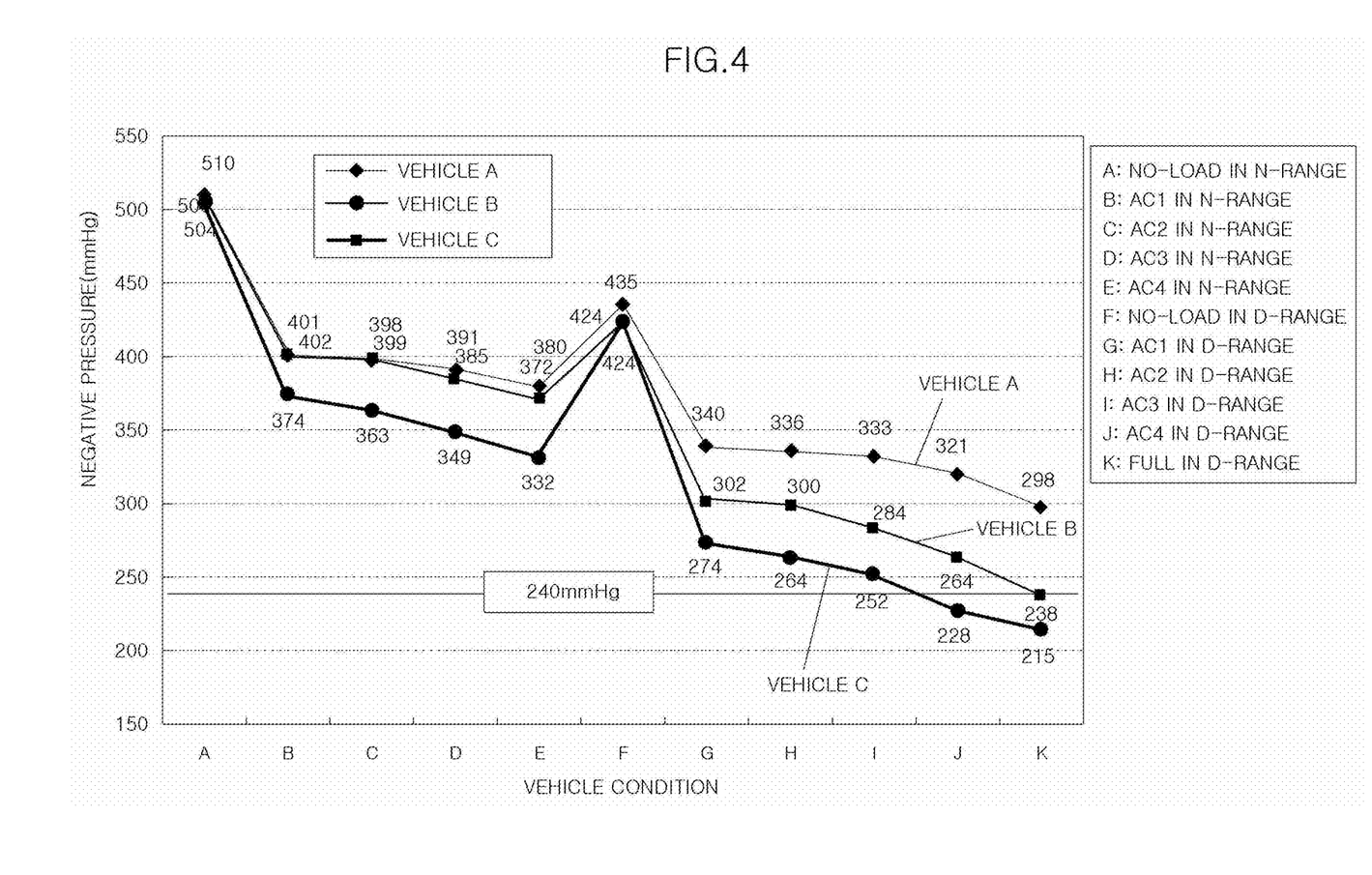
FIG. 4 is graph illustrating an engine negative pressure for each driving state according to an exemplary embodiment of the present disclosure.

As illustrated in FIG. 4, when a generator generating 70 amperes during traveling is fully operated, the engine negative pressure may be less than a required value N depending on the vehicle. Accordingly, in an exemplary embodiment of the present disclosure, when the negative pressure applied to the brake booster 800 is instantaneously less than the required value as the brake pedal is operated repeatedly while treating evaporation gas by operating the purge pump 200, the negative pressure applied to the brake booster 800 may be induced to increase by increasing the engine negative pressure P. Particularly, the operation of the convenience electronic device may be controlled to instantaneously reduce electrical loss due to electronic device operation and various accessory losses.

As illustrated in FIGS. 2A-2B again, in an exemplary embodiment of the present disclosure, when the evaporation gas is being injected into the intake pipe 130, the valve 140, the amount of opening of which is adjusted, may be closed, and the negative pressure is insufficient, the operation state of the convenience electronic device mounted to the vehicle may be adjusted. The convenience electronic device may be any one of electronic devices irrespective of driving safety such as an air conditioner, an interior lamp, a radio, and a power window.

Figure 5:
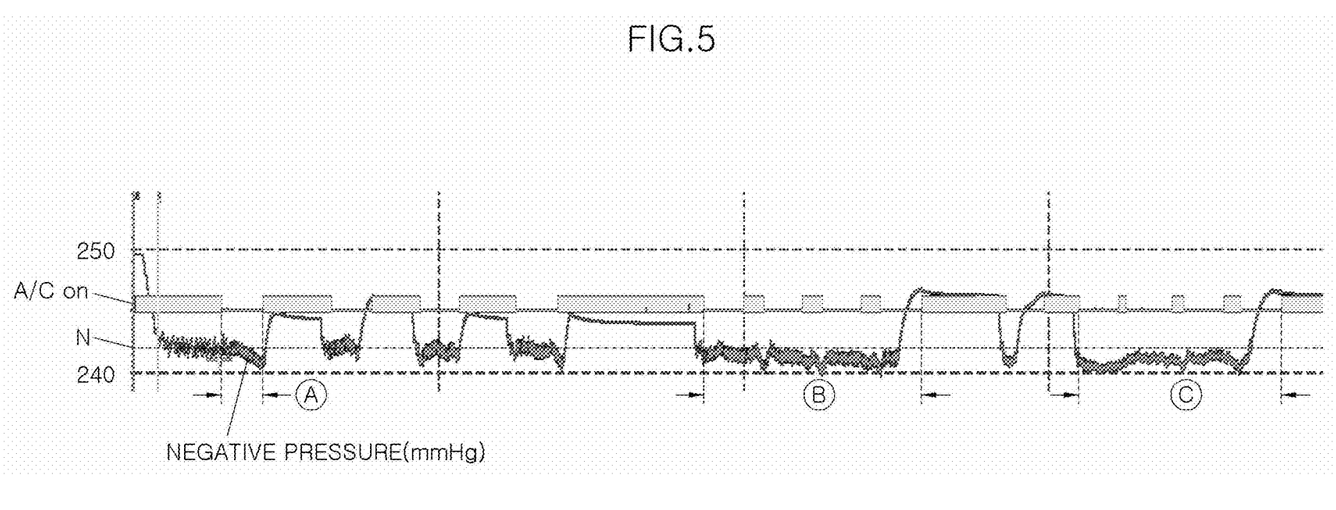
FIG. 5 is a graph illustrating the control of a convenience electronic device for securing a brake booster negative pressure according to an exemplary embodiment of the present disclosure.

As illustrated in FIG. 5, according to an exemplary embodiment, when the time at which the negative pressure is maintained small compared to the required value N is a preset value after the brake pedal is operated, the convenience electronic device may be stopped for a particular period of time (A). In particular, the convenience electronic device may be stopped for about 5.5 seconds.

According to another example, when the time at which the negative pressure is maintained small compared to the required value N exceeds a preset first value and reaches a second value after the brake pedal is operated, the convenience electronic device may be stopped for a particular period of time and repeatedly turned on/off at intervals shorter than a particular period of time (B). In particular, the convenience electronic device may be stopped for about 5.5 seconds and turned on/off at intervals of about 2.5 seconds.

According to a further example, when the time at which the negative pressure is maintained small compared to the required value N exceeds a preset first value and reaches a second value, the convenience electronic device may be stopped for a particular period of time and repeatedly turned on/off at increasing intervals for a particular period of time (B). In particular, the convenience electronic device may be stopped for about 5.5 seconds and repeatedly turned on/off at increasing intervals of about 5.5 seconds to infinity.

Figure 6:
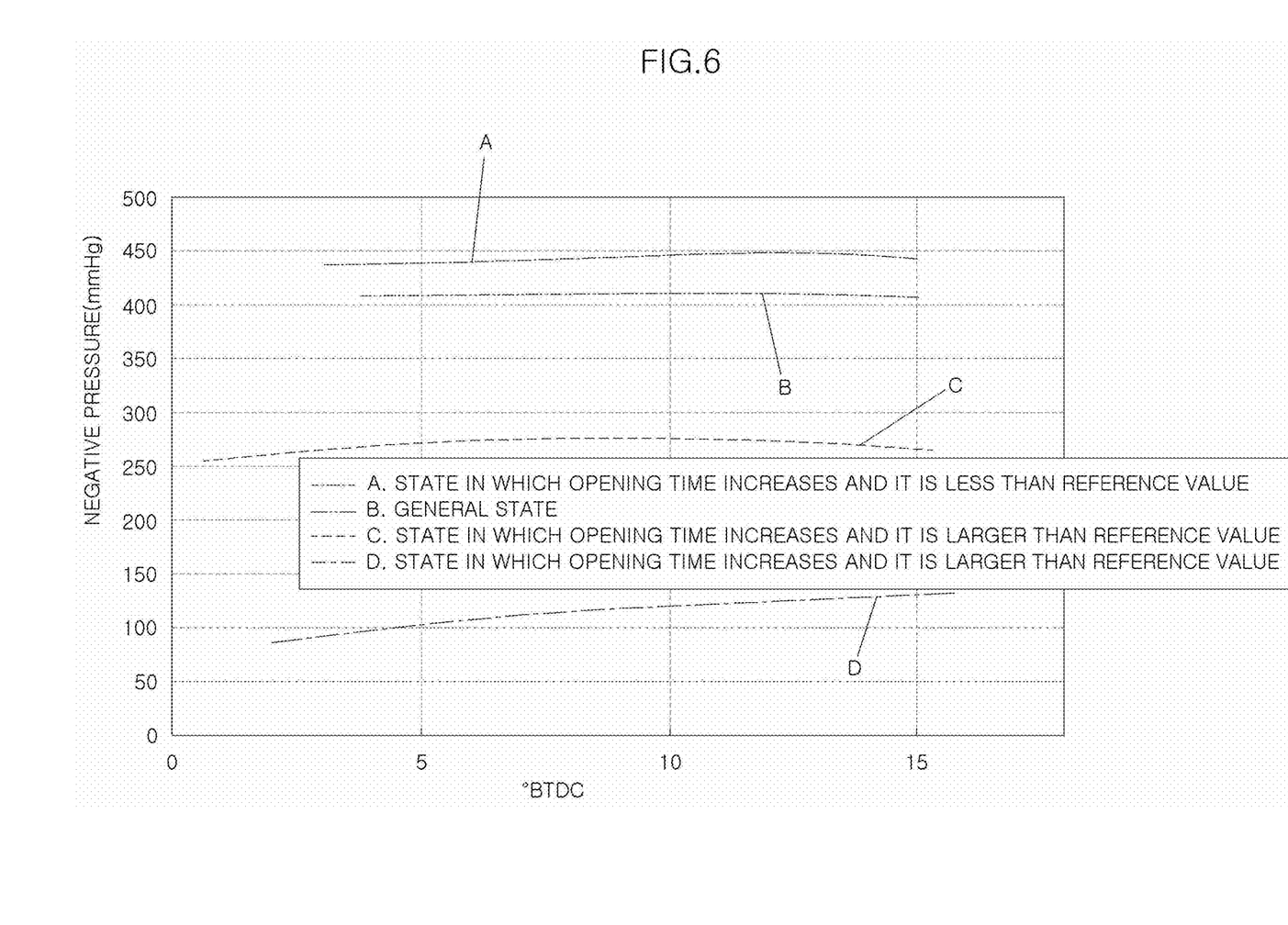
FIGS. 6 and 7 are graphs illustrating the control of an intake valve for securing a brake booster negative pressure according to an exemplary embodiment of the present disclosure.

As illustrated in FIG. 6, the intake negative pressure may be increased when the opening holding time of the intake valve is increased to thus open the intake valve between the BTDC 3 and the BTDC 15 immediately before the top dead center (TDC) and the intake valve moves to a size less than the reference value toward the combustion chamber (A), rather than in the general operation state in which the intake valve is maintained in an open state between the BTDC 4 and the BTDC 15 and the intake valve moves to a size of the reference value toward the combustion chamber (B).

In addition, FIG. 6 shows that even though the opening holding time of the intake valve is prolonged, the intake negative pressure is decreased when the intake valve is opened prior to the BTDC 15 and thus, the holding time is greater than the specific point and the intake valve moves to a size greater than the reference value toward the combustion chamber (C, D).

Figure 7:
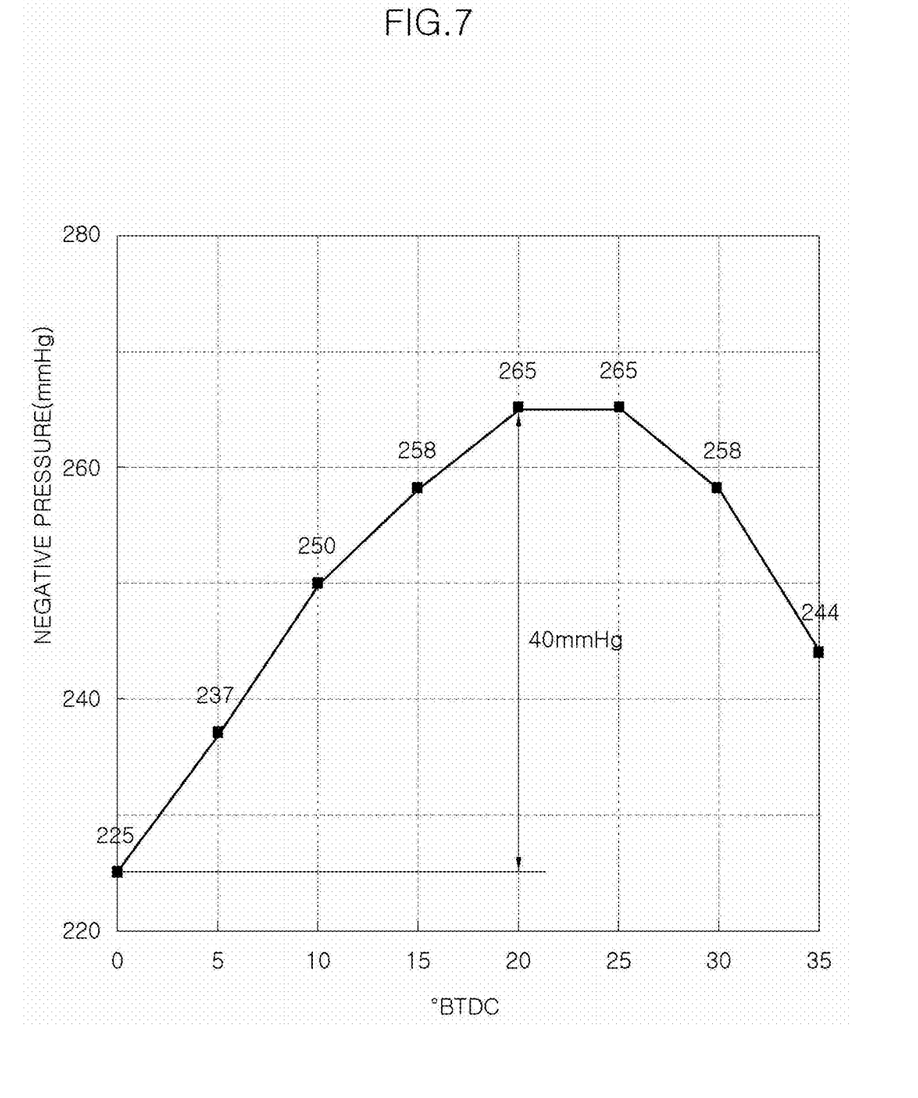

As illustrated in FIG. 7, when the opening/closing length of the intake valve protruding to the combustion chamber is constant during the operation of the intake valve, and when the operation start timing of the intake valve is advanced based on the top dead center, the maximum value of the engine negative pressure is generated at a certain BTDC.

Based on these experimental results, in an exemplary embodiment of the present disclosure, during the operation of the brake pedal, in response to determining that the negative pressure instantaneously applied to the brake booster 800 is insufficient in spite that the valve 140, the amount of opening of which is adjusted, is closed and the operation of the convenience electronic device is controlled, the operation of the intake valve may be adjusted.

According to an example, the closing timing of the intake valve may be advanced based on the top dead center, and the opening/closing length of the intake valve protruding to the combustion chamber may be minimal. According to another example, the opening timing of the intake valve may be advanced based on the top dead center, and the opening/closing length of the intake valve protruding to the combustion chamber may be maintained.

Figure 8:
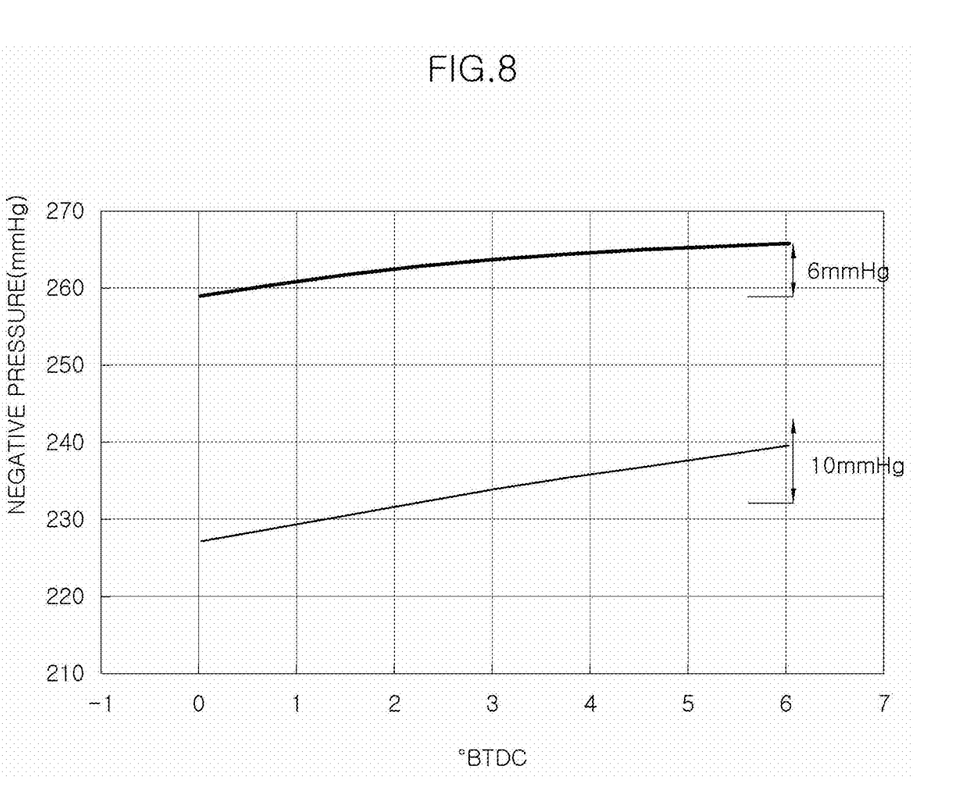
FIG. 8 is a graph illustrating the control of an ignition timing for securing a brake booster negative pressure according to an exemplary embodiment of the present disclosure.

As illustrated in FIG. 8, the engine negative pressure may be increased when the ignition occurs in the BTDC 7 compared to when the ignition occurs by the operation of the spark plug in the BTDC 1. Particularly, even though the operation start timing of the intake valve described above with reference to FIG. 7 is advanced based on the top dead center, when the ignition timing is advanced, the engine negative pressure is increased.

Based on these experimental results, in an exemplary embodiment of the present disclosure, during the operation of the brake pedal, in response to determining that the negative pressure instantaneously applied to the brake booster 800 is insufficient in spite that the valve 140, the amount of opening of which is adjusted, is closed, the operation of the convenience electronic device is controlled, and the operation of the intake valve is adjusted, the ignition timing of the mixture reaching the combustion chamber may be adjusted. According to an example, the ignition timing may be advanced based on the top dead center so that it is earlier.

Figure 9:
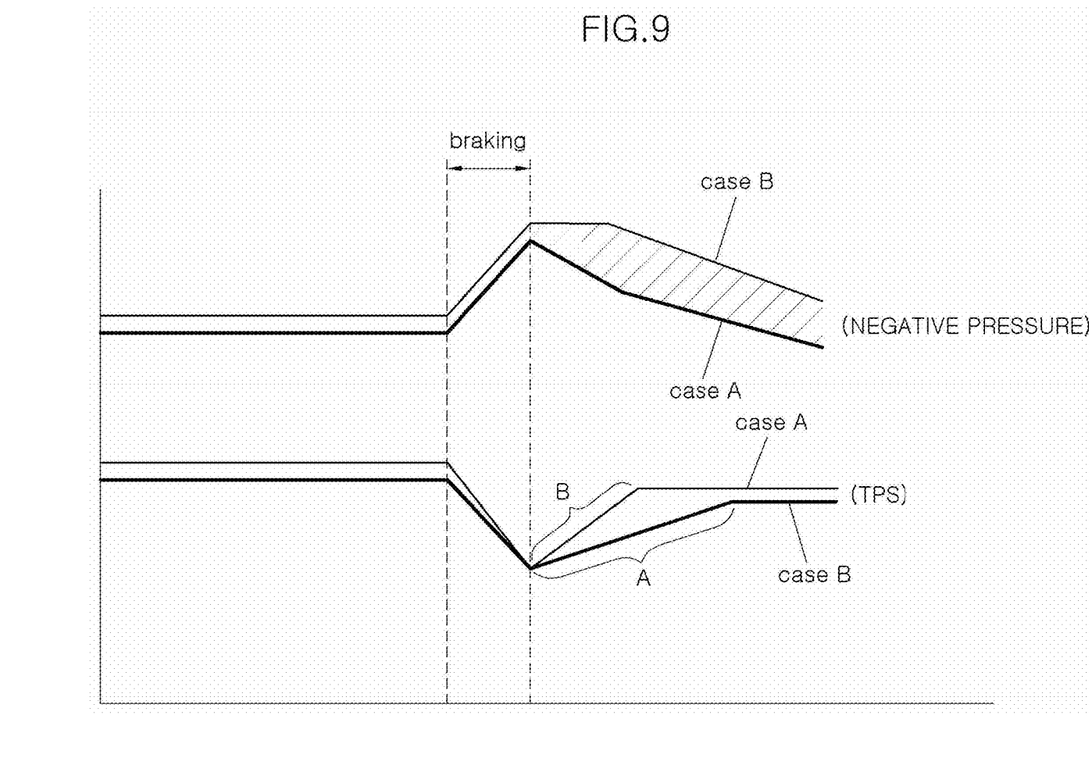
FIG. 9 is a graph illustrating the control of a throttle valve for securing a brake booster negative pressure.

As illustrated in FIG. 9, when the change in the amount of opening of the throttle valve (inclination B in the drawing) is substantial (Case B) compared to when the change in the amount of opening of the throttle valve (inclination A in the drawing) is normal (Case A) after the inertia traveling brake pedal is operated, the recovery speed of the engine RPM is faster and the increase of the engine negative pressure is faster.

According to the method of securing the negative pressure of the brake booster 800 according to the exemplary embodiment of the present disclosure, since the evaporation gas is pressurized by the operation of the purge pump 200 and injected into the intake pipe 130, it may be possible to inject the evaporation gas more smoothly into the intake pipe 130 even though the internal pressure of the intake pipe 130 is equal to or greater than the atmospheric pressure by the operation of the supercharger. Since the negative pressure is generated in the brake booster 800, the inside of the brake booster 800 may be maintained in a vacuum-like state.

In addition, even when the brake is repeatedly used during the removal of the evaporation gas, it may be possible to appropriately maintain the negative pressure applied to the brake booster 800 by adjusting the operation of the convenience electronic device, adjusting the opening/closing timing of the intake valve, and adjusting the ignition timing of the mixture.

While the present disclosure has been described with respect to the specific exemplary embodiments, it will be apparent to those skilled in the art that various changes and modifications may be made without departing from the spirit and scope of the disclosure as defined in the following claims.

What is claimed is:

1. A method of securing brake booster negative pressure, comprising:
   operating, by a controller, a purge pump connected to a canister having evaporation gas absorbed thereon and a brake booster;
   determining, by the controller, whether the evaporation gas is injected into an intake pipe by the operation of the purge pump; and
   determining, by the controller, whether a negative pressure of the brake booster is insufficient,
   wherein when the evaporation gas is being injected into the intake pipe and the negative pressure is insufficient, a degree of opening of a valve provided in a line connecting the canister and the purge pump is adjusted,
   wherein when the negative pressure is insufficient in a state in which the evaporation gas is being injected into the intake pipe and the degree of opening of the valve is adjusted, and operation state of a convenience electronic device mounted to a vehicle is adjusted, and
   wherein the convenience electronic device is repeatedly turned on and off at intervals shorter than a particular period of time when or after an operation thereof is stopped for the particular period of time, or the convenience electronic device is repeatedly turned on and off at increasing intervals for the particular period of time after the operation thereof is stopped for the particular period of time.

2. The method of claim 1, wherein a rotational speed of the purge pump is gradationally adjusted to inject the evaporation gas into the intake pipe at a desired concentration.

3. The method of claim 1, wherein when the negative pressure is insufficient in a state in which the evaporation gas is being injected into the intake pipe, the degree of opening of the valve is adjusted, and the operation state of the convenience electronic device is adjusted, an operation of an intake valve is adjusted.

4. The method of claim 3, wherein a closing timing of the intake valve is advanced based on a top dead center, and an opening/closing length of the intake valve protruding to a combustion chamber is decreased.

5. The method of claim 3, wherein an opening timing of the intake valve is advanced based on a top dead center, and an opening/closing length of the intake valve protruding to a combustion chamber is maintained.

6. The method of claim 3, wherein when the negative pressure is insufficient in a state in which the evaporation gas is being injected into the intake pipe, the degree of opening of the valve is adjusted, the operation state of the convenience electronic device is adjusted, and the opening/closing timing of the intake valve is adjusted, an ignition timing of a mixture reaching a combustion chamber is adjusted.

7. The method of claim 6, wherein the ignition timing is advanced based on a top dead center.

8. The method of claim 1, wherein when the evaporation gas is not being injected into the intake pipe, the degree of opening of the valve provided in the line connecting the canister and the purge pump is adjusted.

9. A system of securing brake booster negative pressure, comprising:
a memory configured to store program instructions; and
a processor configured to execute the program instructions, the program instructions when executed configured to:
operate a purge pump connected to a canister having evaporation gas absorbed thereon and a brake booster;
determine whether the evaporation gas is injected into an intake pipe by the operation of the purge pump; and
determine whether a negative pressure of the brake booster is insufficient,
wherein when the evaporation gas is being injected into the intake pipe and the negative pressure is insufficient, a degree of opening of a valve provided in a line connecting the canister and the purge pump is adjusted,
wherein when the negative pressure is insufficient in a state in which the evaporation gas is being injected into the intake pipe and the degree of opening of the valve is adjusted, and operation state of a convenience electronic device mounted to a vehicle is adjusted, and
wherein the convenience electronic device is repeatedly turned on and off at intervals shorter than a particular period of time when or after an operation thereof is stopped for the particular period of time, or the convenience electronic device is repeatedly turned on and off at increasing intervals for the particular period of time after the operation thereof is stopped for the particular period of time.

10. The system of claim 9, wherein a rotational speed of the purge pump is gradationally adjusted to inject the evaporation gas into the intake pipe at a desired concentration.

11. The system of claim 9, wherein when negative pressure is insufficient in a state in which the evaporation gas is being injected into the intake pipe, the degree of opening of the valve is adjusted, and the operation state of the convenience electronic device is adjusted, an operation of an intake valve is adjusted.

12. The system of claim 11, wherein a closing timing of the intake valve is advanced based on a top dead center, and an opening/closing length of the intake valve protruding to a combustion chamber is decreased.

13. The system of claim 11, wherein an opening timing of the intake valve is advanced based on a top dead center, and an opening/closing length of the intake valve protruding to a combustion chamber is maintained.

14. The system of claim 11, wherein when the negative pressure is insufficient in a state in which the evaporation gas is being injected into the intake pipe, the degree of opening of the valve is adjusted, the operation state of the convenience electronic device is adjusted, and the opening/closing timing of the intake valve is adjusted, an ignition timing of a mixture reaching a combustion chamber is adjusted.

15. The system of claim 14, wherein the ignition timing is advanced based on a top dead center.

16. The system of claim 9, wherein when the evaporation gas is not being injected into the intake pipe, the degree of opening of the valve provided in the line connecting the canister and the purge pump is adjusted.

* * * * *